United States Patent [19]

Rogers

[11] Patent Number: 4,488,011
[45] Date of Patent: Dec. 11, 1984

[54] ON-PREMISE TELEPHONE TEST JACK

[76] Inventor: M. Maurice Rogers, Rte. 1, Box 214, Downsville, La. 71234

[21] Appl. No.: 498,733

[22] Filed: May 27, 1983

[51] Int. Cl.³ ............................................. H04M 1/24
[52] U.S. Cl. .......................... 179/175.11; 179/175.25; 179/175.3 R
[58] Field of Search ............... 179/175.25, 91 A, 175, 179/175.11, 175.3, 175.3 F, 81 R, 99 R, 175.2 B

[56] References Cited

U.S. PATENT DOCUMENTS 4,415,778 11/1983 Turner .................... 179/175.3 F X Primary Examiner—Stafford D. Schreyer
Attorney, Agent, or Firm—LeBlanc, Nolan, Shur & Nies

[57] ABSTRACT

A telephone test jack located at a subscriber's station between a telephone company's telephone transmission line and the subscriber's telephone equipment for receiving a line cord plug of a conventional telephone set and having contact terminals for connecting the telephone set to the transmission line and switching contacts actuated by insertion of the line cord plug to disconnect the entire circuit on the subscriber's side of the test jack from the telephone line for the purpose of determining whether a malfunction is in the circuit on the subscriber's side of the test jack or in the circuit on the telephone company's side of the test jack.

13 Claims, 15 Drawing Figures

ON-PREMISE TELEPHONE TEST JACK

FIELD OF THE INVENTION

This invention relates to the electrical testing of subscriber telephone circuits and is directed to a novel, on-premise test facility for enabling an inexperienced person to determine whether a malfunction is caused by his or her privately owned telephone equipment or by the telephone company's transmission facility without using any special testing tools.

BACKGROUND AND SUMMARY OF INVENTION

Because of the recent changes in the regulation of the telephone industry, an increasing number of customers or subscribers are purchasing their own telephone equipment rather than leasing telephone sets from telephone companies. Telephone companies, however, normally do not service the equipment which is privately owned by a subscriber, thus making the subscriber responsible for the repair of the privately owned telephone equipment.

This situation gives rise to a problem in that none of the subscriber telephone circuits known to applicant is equipped or designed to enable an inexperienced person to determine whether a malfunction is due to a fault in the telephone company's facilities or a fault in the privately owned telephone equipment. The subscriber may therefore pay for a needless service call by the telephone company's repairman where the repairman finds that the trouble is in the subscriber's privately owned equipment.

In accordance with this invention, the foregoing problem is overcome by the provision of a novel test jack which is located on the subscriber's premises and which is connected intermediate the telephone company's telephone line and the subscriber's privately owned telephone equipment. Preferably, the test jack is wired into the subscriber circuit at the point of connection between the subscriber's equipment and the telephone company's facility. Switching contacts in the test jack normally connect the telephone company's telephone line to the subscriber's telephone equipment.

To conduct a test, an available, conventional telephone set having a line cord plug is plugged into the test jack. The test jack's contacts are operated by the line cord plug to connect the telephone used in the test to the telephone company's line and to disconnect the entire circuit on the subscriber's side of the test jack from the telephone company's line, thereby electrically isolating the telephone company's facility from the telephone equipment that may be causing the malfunction.

If the user receives the dial tone and is able to dial into the telephone company's central office upon plugging the test telephone into the test jack, then the malfunction is in the subscriber's privately owned telephone equipment or circuit connections. If no dial tone is received and the trouble remains on line after plugging the test telephone into the test jack, then the fault is in the telephone company's line or facility to warrant a call to the telephone company for service. This simple test thus enables a person to determine whether a malfunction is in the subscriber's equipment or in the telephone company's facility to save the cost of a service call by the telephone company's repairman in the event that the trouble is in the subscriber's privately owned equipment.

Advantageously, the test jack of this invention is designed to accept the standard, FCC (Federal Communication Commission) approved line cord plug which is on all FCC approved telephone sets. Available telephone sets on a subscriber's premises usually meet this requirement and are therefore usable in the test with the test jack of this invention. The test, of course, will be indeterminate if the telephone set used in the test is out of order. However, most households and other premises have two or more telephone sets, and the chances of all available sets being faulty are nil. Furthermore, a working telephone may be borrowed from a neighbor to conduct the test.

In new or future installations, the point of connection between the telephone company's facility or line and the subscriber's privately owned equipment is likely to be at the on-premise lightening-arresting station protector or an on-premise terminal strip. In such installations, the test jack of this invention is advantageously located at the subscriber's side of the station protector or terminal strip. The test jack may be built into the station protector. Alternatively, it can be an independent unit for connection at the appropriate place as an add-on module.

From the foregoing summary it will be appreciated that the test jack of this invention affords a quick and easy test to determine whether a malfunction is on the subscriber's side of the test jack or the telephone company's side of the test jack without requiring the use of any special testing tools and also without requiring any technical knowledge about telephone circuits.

Furthermore, the test jack of this invention provides a readily accessible test point for servicemen, eliminating the need to remove terminals and lift wiring, and to thereafter re-terminate the wiring and to replace the wiring if the wiring breaks upon removal.

With the foregoing in mind, the general aim and purpose of this invention is to provide a novel test jack facility for enabling a person to determine whether a malfunction is in the telephone company's facility or the subscriber's privately owned equipment without requiring the use of any equipment other than an available, conventional telephone set.

A more specific object of this invention is to provide a novel test jack located in a subscriber's circuit between the telephone company's line and the subscriber's telephone equipment and having plug-operated switching contacts for connecting a test telephone to the telephone line and also for disconnecting the subscriber's telephone equipment from the line to isolate the line from the entire circuit on the subscriber's side of the test jack.

Further objects of this invention will appear as the description proceeds in connection with the appended claims and the below-described drawings.

DETAILED DESCRIPTION

Figures 1, 1A, 14:
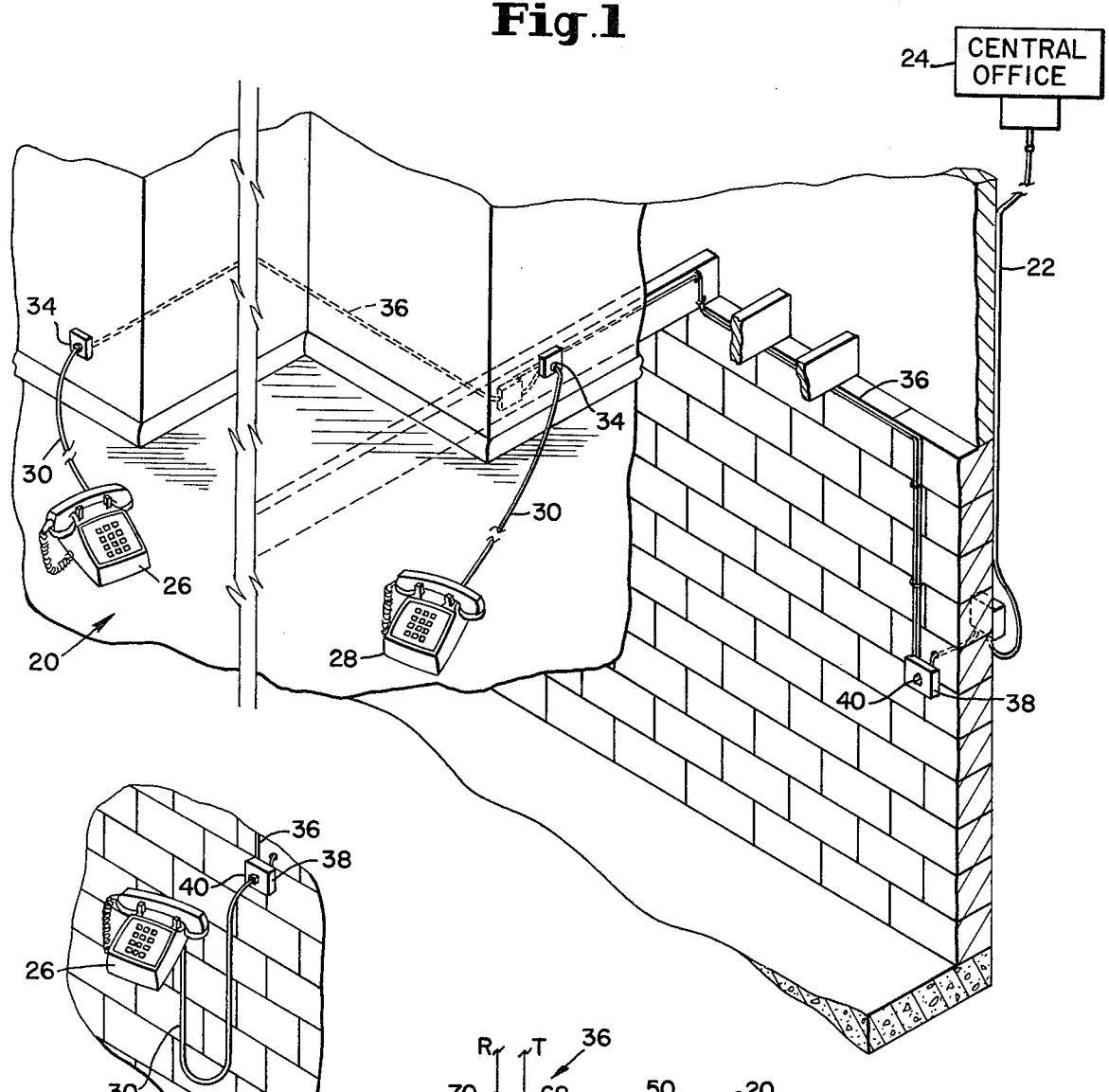
FIG. 1 is a partially schematic perspective view of a telephone system incorporating one embodiment of this invention.
FIG. 1A is a fragmentary perspective view corresponding to FIG. 1, but showing a telephone set plugged into the test jack of this invention for conducting a test.
FIG. 14 is a schematic circuit diagram similar to FIG. 2, but illustrating yet another embodiment of this invention.
Figure 2:
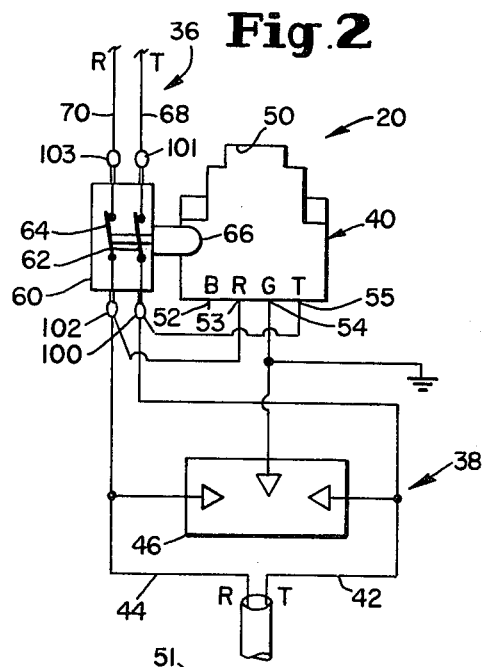
FIG. 2 is a schematic diagram of the subscriber circuit at the subscriber station shown in FIG. 1.

Referring to FIGS. 1 and 2, the telephone system incorporating one embodiment of this invention comprises a subscriber telephone station 20 connected by way of a telephone company's telephone transmission line 22 to the company's central office 24. Transmission line 22 may be a typical two wire line having tip and ring conductors 42 and 44 as shown in FIG. 2.

Station 20 is shown, by way of example, to comprise two conventional telephone sets 26 and 28. It will be appreciated that some subscriber stations may have only one telephone set, while others may have more than two sets. The telephone sets at the subscriber's station are considered to be owned by the subscriber. Each of the telephone sets is of the type having a line cord 30 terminating in a line cord plug 32 (see FIG. 7) which is removably plugged into a conventional telephone jack 34 for connecting the telephone set to the on-premise station wiring 36.

In the embodiment shown in FIG. 1, the station wiring 36 connects the subscribers's telephone sets 26 and 28 through the test jack of this invention and a station protector 38 to transmission line 22. Station protector 38 forms a part of the subscriber's telephone station 20 and is connected to the telephone company's transmission line 22 or line wire as it is also called.

The test jack of this invention is indicated at 40 in FIG. 1 and is located on the subscriber's premises preferably at the point of connection of the subscriber's equipment to the telephone company's transmission facility or outside plant, as it is also called. In the embodiment illustrated in FIG. 1, this point of connection is at the station protector 38 for an installation where the subscriber is considered to be responsible for his or her own telephone set and also for the station wiring up to the station protector. Test jack 34 is preferably located at the subscriber's side of the station protector's circuit as shown so that it is protected by the station protector.

For new installations where the telephone company providing the telephone service has discontinued the practice of leasing telephones to subscribers, it is expected that the telephone company will require the subscriber to be responsible for the servicing of this or her privately owned telephone equipment and also the on-premise station wiring up to the station protector or to a terminal board or strip (not shown). For existing installations, some telephone companies may yet adopt this practice.

In any event, it will be appreciated that, for any given installation, test jack 40 is preferably located at the interface or point of connection between the telephone company's circuit or facility and the telephone sets of any on-premise wiring, circuits or equipment which the subscriber is expected to be responsible for.

Station protector 38 may be of any suitable conventional construction and is shown in FIG. 2 to comprise a conventional three electrode, gas tube surge arrester 46 connected at its end electrodes across the tip and ring conductors 42 and 44. The center electrode of arrester 46 is grounded such that when the gas tube is fired by lightening or other surges a high conductive ion path will be established from the tip and ring conductors to the tube's grounded center electrode.

In the embodiment shown in FIG. 1, test jack 40 is included as a part of station protector 38 and is connected to the tip and ring conductors 42, 44 on the subscriber side of arrester 46.

Test jack 40 comprises a housing 48 having a socket 50 sized to slidably and interfittingly receive a telephone set's line cord plug such as line cord plug 32. Housing 48 is formed from suitable plastic material or any other electrical insulating material and may be mounted at any suitable, accessible location on station protector 38. For example, housing 48 may be mounted on a cover or enclosure 51 (see FIG. 1) of protector 38 or any other suitable structural part of protector 38. Alternatively, test jack 40 may be formed separately of protector 38 as an independent unit for installation as an add-on module as will be described later on in conjunction with the embodiment shown in FIG. 12. Socket 50 has a generally rectangular configuration corresponding to that of plug 32.

As shown in FIGS. 2 and 4–6, test jack 40 is provided with a standard set of four mutually electrically insulated contact terminals in the form of thin, parallel spaced apart wires 52, 53, 54 and 55 having free terminal ends protruding into socket 50 and lying along the socket's bottom wall at the mouth of socket 50. The construction and arrangement of contact terminals 52–55 are the same as those in a standard, FCC approved telephone jack. Terminals 52–55 are customarily identified in the telephone industry as battery, ring, ground and tip terminals. Terminal 54 is connected to a common or ground and may be interconnected with the center electrode of the gas tube arrester 46 as shown in FIG. 2. Terminals 55 and 53 are respectively connected to the transmission line's tip and ring conductors 42 and 44 on the subscriber's side of arrester 46.

In addition to the contact terminals 52–55, test jack 40 is equipped with suitable plug-actuatable switching elements such as a microswitch 60 having two sets of normally closed switching contacts 62 and 64 as schematically shown in FIG. 2. Microswitch 60 is provided with a switch actuator element 66 protruding into socket 50 through an aperture in one of the jack's socket-defining walls.

Actuator 66 is yieldably baised (as by an unshown spring) to a home position where it maintains the two contact sets 66 and 64 closed. Actuator 66 lies in the path of insertion of a line cord plug. Insertion of a line cord plug, such as plug 32, therefore engages and shifts actuator 66 from its home position to an alternate position where it opens contacts 62 and 64.

Figure 3:
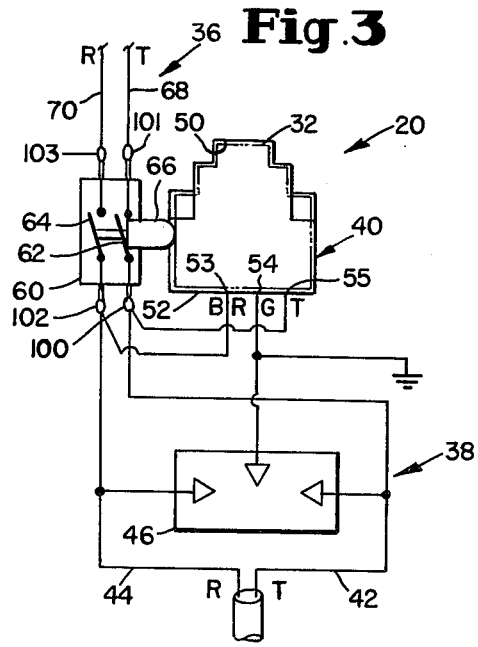
FIG. 3 is a fragmentary, generally schematic view corresponding to FIG. 2, but illustrating the circuit conditions when a line cord plug is plugged into the test jack of this invention.
Figure 4:
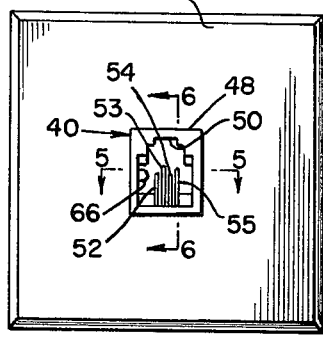
FIG. 4 is a front elevation of the test jack shown in the previous Figures.
Figure 5:
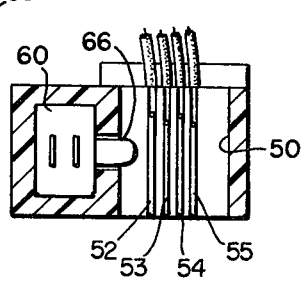
FIG. 5 is a section taken substantially along lines 5—5 of FIG. 4.
Figure 6:
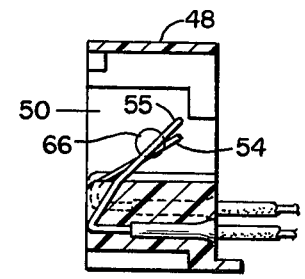
FIG. 6 is a section taken substantially along lines 6—6 of FIG. 4.

FIGS. 2 and 3 schematically illustrate the circuit connections for contact sets 62 and 64 as well as contact terminals 52–55. When closed, contact set 62 electrically connects the tip conductor 42 of the telephone company's line 22 to the tip conductor 68 of the station wiring 36. In its closed condition, contact set 64 electrically connects the ring conductor 44 of the telephone company's line 22 to the ring conductor 72 of the station wiring 36.

From the description thus far it will be appreciated that the ring and tip conductors of the telephone company's transmission line 22 are normally connected through the test jack's switching contacts 62 and 64 to the tip and ring conductors of the station wiring 36 and thus to the subscriber's telephone set or sets, as the case may be.

Except for microswitch 60 and the housing construction for mounting the microswitch, test jack 40 is the same as a standard, FCC approved telephone jack. Standard telephone jacks of this type are described in the Kelso U.S. Pat. No. 4,214,132.

Figure 7:
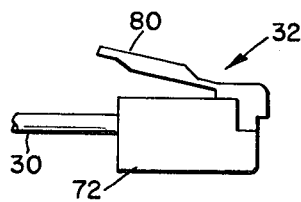
FIG. 7 is a side elevation of the line cord plug shown in the previous Figures.
Figure 8:
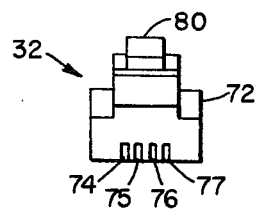
FIG. 8 is a front elevation of the line cord plug shown in FIG. 7.
Figure 9:
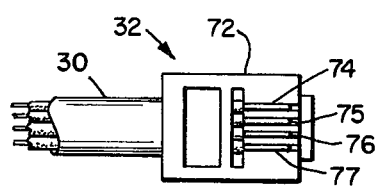
FIG. 9 is a bottom plan view of the line cord plug shown in FIGS. 7 and 8.

Referring to FIGS. 7–9, line cord plug 32 comprises a plug body 72 having a generally rectangular cross-section and mounting four mutually insulated, exposed, parallel spaced apart, flat-sided wires 74, 75, 76 and 77 which terminate in terminal ends and which are referred to in the telephone industry as battery, ring, ground and tip terminals. Wires 74–77 extend exteriorly along the front end wall of plug body 72 and rearwardly along the bottom wall of the plug body.

The plug's terminal wires 74–77 are individually connected to separate conductors in the line cord 30 which may be in the form of a cable and which connects to terminals in the base of the telephone set.

Plug body 72 may be formed from a suitably electrically insulating plastic material and is conventionally provided with a latch 80 on the top side for releasably latching the plug in the socket of a standard telephone jack such as jack 34, or in socket 50 of test jack 40. The test jack's socket 50 is sized and configured to interfittingly and slidably receive plug 32.

The construction of plug 32 as described above is conventional and is of the FCC approved type such as Part No. Cord D4Bu29 1291583 as manufactured by the Western Electric Company. This type of plug is described in the previously identified U.S. Pat. No. 4,214,132.

The telephone jack 34 for each of the subscriber's telephone sets is preferably of the FCC approved type as described above. Telephone jacks of this type are described in the previously identified U.S. Pat. No. 4,214,132.

The location of test jack 40 in the embodiment of FIG. 1 is for installations where the subscriber owns the telephone set or sets, as the case may be, and additionally owns or at least is responsible for the station wiring between the telephone jacks 34 and the station protector 38.

In the event of a malfunction of the telephone circuit described above, the subscriber or other person selects an available telephone set having a suitable line cord plug which fits with test jack 40, such as either one of the telephone sets 26, 28, but preferably a telephone set known to be in working order. Instead of using an available telephone on the premises, the individual may borrow a working telephone set from a neighbor.

Figure 10:
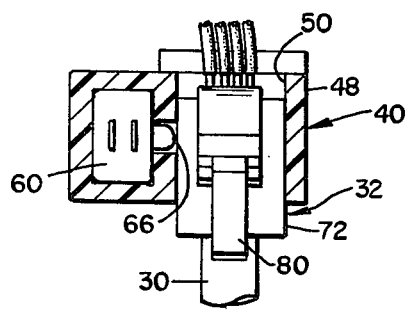
FIG. 10 is a section corresponding to FIG. 5, but illustrating the line cord plug inserted into the test jack's socket.
Figure 11:
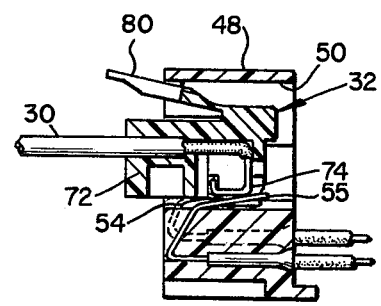
FIG. 11 is a section corresponding to FIG. 6, but illustrating the line cord plug inserted into the test jack's socket.

The user inserts the line cord plug of the selected telephone set into test jack 40 as shown in FIGS. 1A, 10 and 11. As the plug is slidably inserted into the test jack's socket, its nose end engages and shifts the microswitch actuator 66, causing the switching contacts 62 and 64 to open (see FIG. 3) to electrically disconnect the entire circuit on the subscriber's side of test jack 40 from the telephone company's line 22. Insertion of plug 32 into the test jack's socket 50 additionally establishes electrical contact between the plug contact wires 74–77 and the test jack's contact terminal wires 52–55, respectively. As a result, the telephone set being used for the test will be properly connected to the tip and ring conductors of the telephone company's transmission line 22 to receive a dial tone when the telephone is transferred to its off-hook state if the telephone company's transmission facility (which includes transmission line 22) is in proper working order.

If the dial tone is received upon transferring the telephone patched into test jack 40 to its off-hook state, then the user is informed that the line is clear and in proper working order and that the malfunction is in the station wiring 36 or the telephone sets connected to the station wiring. The user should therefore call an outside repairman rather than the telephone company, thus saving the cost of a service trip by the telephone company's repairman. If the user does not receive a dial tone upon plugging the telephone set into thest jack 40 and upon transferring the phone to its off-hook state, he or she then has reasonable assurance that the fault is in the telephone company's facility, thus warranting a call to the telephone company for service. Upon completing the test, the user unplugs the test telephone from test jack 40.

From the foregoing description it will be appreciated that test jack 40 provides a simple, quick and easy test which may be performed by experienced or inexperienced individuals for determining whether a malfunction in the telephone system is due to a fault in the subscriber's telephone equipment or other circuitry on the subscriber's side of test jack 40 or a fault in the telephone company's transmission line 22 or other facility on the telephone company's side of the test jack without requiring any equipment other than a conventional telephone set.

Figure 12:
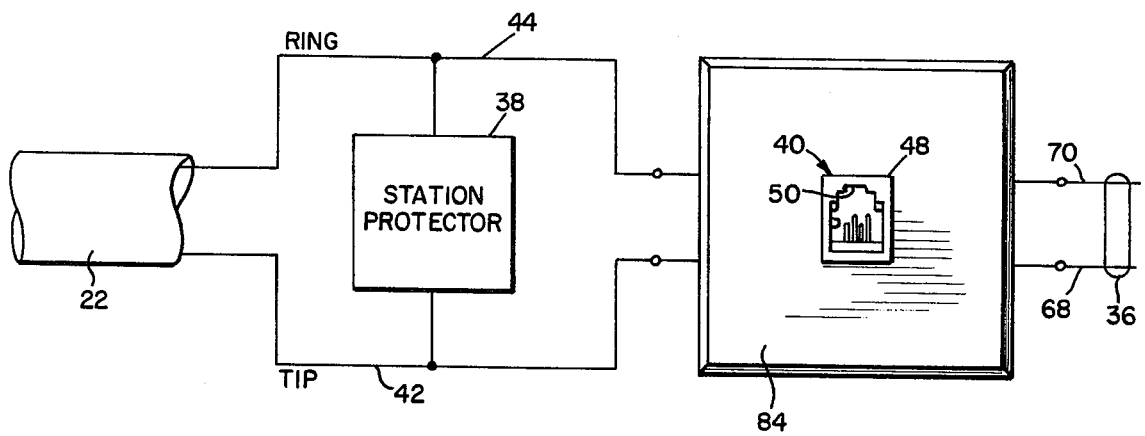
FIG. 12 is a partially schematic view of the subscriber's station circuit according to another embodiment of this invention where the test jack is connected into the subscriber's station as an add-on module.

In the embodiment shown in FIG. 12, test jack 40 is manufactured as a separate unit independently of station protector 38 so that it may be wired into an existing telephone station as an add-on module. In FIG. 12, jack 40 is mounted on a suitable terminal block 84 which may be of the wall-mounted or panel-mounted type. In FIG. 12, jack 40 is wired into the subscriber's circuit immediately on the subscriber's side of station protector 38.

In the test jack embodiments shown in FIGS. 1–12, test jack 40 is provided with a first set of terminals 100 and 101 and a second set of terminals 102 and 103. Contact set 62 is connected between terminals 100 and 101, and contact set 64 is connected between terminals 102 and 103. The transmission line's tip and ring conductors 42 and 44 are connected to terminals 100 and 102, respectively. The station wiring tip and ring conductors 68 and 70 are connected to terminals 101 and 103, respectively.

Figure 13:
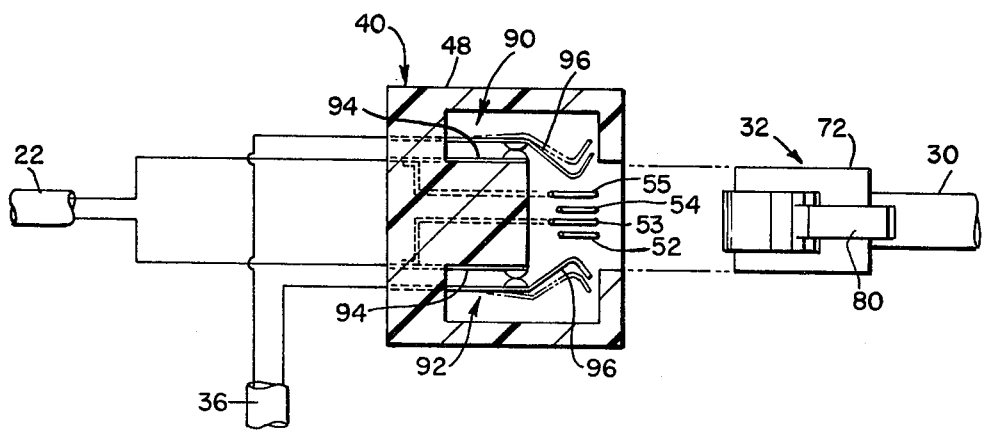
FIG. 13 is a section similar to FIG. 5, but illustrating another embodiment of the test jack in which discrete switching contacts are utilized in place of the microswitch shown in FIGS. 2 and 5.

In the embodiment shown in FIG. 13, microswitch 60 is replaced by two discrete sets of normally closed contacts 90 and 92 which are mounted in the jack housing 48. Contact set 90 normally connects the tip conductor of the telephone company's transmission line 22 to the tip conductor 68 of the station wiring 36, and contact set 92 normally connects the ring conductor of transmission line 22 to the ring conductor 70 of the station wiring 36.

Each of the contact sets 90 and 92 has a stationary contact element 94 and a flexible contact spring element 96. The flexible contact spring elements 96 for the two sets of contacts protrude into the test jack's socket 50 and are arranged for engagement by line cord plug 32 so that they are flexed out of contact with the stationary contact elements 94 to positions on opposite sides of the line cord plug as shown in phantom lines in FIG. 13. Thus, insertion of the line cord plug 32 into the test jack's socket 50 opens the contact sets 90 and 92, thereby electrically disconnecting the entire circuit on the subscriber's side of test jack 40 from transmission line 22 and thus isolating the transmission line from the subscriber's telephone equipment. Except for the replacement of microswitch 60 with the discrete sets of contacts 90 and 92, the test jack of FIG. 13 is the same as the one shown in the previous Figures.

Instead of being part of test jack 40 for actuation by the line cord plug 32, microswitch 60 may be separately housed and equipped with a finger operated actuator 66' as shown in FIG. 14. In the embodiment of FIG. 14, the specially constructed test jack 40 is replaced by a test jack 40' which is preferably the same as the standard telephone jack 34 for receiving line cord plug 32 to establish the ring and tip circuit connections between the telephone set used in the test and the telephone company's ring and tip conductor's 42 and 44 at the test point in the telephone circuit.

The microswitch actuator 66' may be of the spring biased type as shown so that upon release, the microswitch contacts resume their normally closed conditions. Alternatively, the microswitch actuator may be of the two position bi-stable type (such as a light switch) having a first position for closing the microswitch contacts and a second position for opening the microswitch contacts.

In conducting a test with the embodiment shown in FIG. 14, the user operates microswitch 60 to disconnect the telephone company's line 22 from the on-premise portion of the telephone circuit and inserts the line cord plug 32 of a test telephone into the socket of test jack 40' to establish the ring and tip circuit connections with the telephone company's telephone line 22. Upon completion of the test, the line cord plug is removed and microswitch 60 is operated to its normally closed circuit condition illustrated in FIG. 14.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of euqivalency of the claims are therefore intended to be embraced therein.

What is claimed and desired to be secured by Letters Patent is:

1. A telephone test jack adapted to be located at a subscriber's premises and connected intermediate the subscriber's on-premise telephone equipment and a telephone company's transmission line providing service to the subscriber, said telephone test jack comprising a socket sized and configured to slidably receive a line cord plug which is connected at the end of a line cord of a telephone set, ring and tip terminal elements adapted to be connected to the ring and tip conductors of said transmission line, said ring and tip terminal elements extending into said socket at positions where they are contacted by ring and tip contact elements on said line cord plug upon insertion of said plug into said socket to provide for the connection of said telephone set to said transmission line for receiving a dial tone upon transferring the telephone set to its off-hook state, and normally closed plug-actuatable switching contact means providing normal through tip and ring circuit connections between said transmission line and said telephone equipment, said switching contact means being actuatable to a circuit breaking condition by said line cord plug upon insertion of the line cord plug into said socket to electrically disconnect said telephone equipment from said transmission line upon connecting said telephone set to said transmission line.

2. The telephone test jack defined in claim 1 wherein said telephone equipment comprises at least one subscriber-owned telephone set having a line cord terminating in a line cord plug which is plugged into a telephone jack in the telephone circuit at the subscriber's premises, and wherein said socket is sized and configured to slidably receive the line cord plug of said subscriber-owned telephone set for enabling the subscriber-owned telephone set or one identical to it to be plugged into the test jack to establish the connection of the telephone set to said transmission line at the test jack and to actuate said switching contact means for disconnecting the entire circuit on the subscriber's side of the test jack from the transmission line.

3. The telephone test jack defined in claim 2 wherein said contact switching means comprises first and second sets of normally closed contacts and forms a part of a switch assembly having an actuator for operating said first and second sets and protruding to said socket in the insertion path of a line cord plug to be engaged and displaced by the line cord plug to a position where it opens said first and second sets of contacts, said first set of contacts provide a circuit connection between the tip conductor of said transmission line and the tip conductor of station wiring at the subscriber's premises, and said second set of contacts providing a circuit connection between the ring conductor of said transmission line and the ring conductor of said station wiring.

4. The telephone test jack defined in claim 2 wherein said switching contact means comprises first and second sets of normally closed contacts, each of said sets of contacts having a stationary contact and a flexible contact spring member normally contacting said stationary contact and being engageably deflectible by a line cord plug to a position where it is out of contact with the stationary contact upon insertion of the line cord plug into said socket.

5. A station protector and test facility unit adapted to be located at a subscriber's premises in a telephone circuit having a telephone transmission line extending from a central office, telephone equipment located at the subscriber's premises and station wiring providing circuit connections to said telephone equipment, said unit comprising a lightning arrester adapted to be electrically connected to the tip and ring conductors of said transmission line for arresting surges due to lightening or other causes, a structural part, and a test jack mounted on said structural part at an accessible location, said test jack having a socket sized and configured to slidably receive a line cord plug which is connected at the end of a line cord of a telephone set, ring and tip terminal elements adapted to be connected to the ring and tip conductors of said transmission line, said ring and tip terminal elements extending into said socket at positions where they are contacted by ring and tip contact elements on said line cord plug upon insertion of said plug into said socket to provide for the connection of said telephone set to said transmission line for receiving a dial tone upon transferring the telephone set to its off-hook state, and normally closed plug-actuatable switching contact means providing normal through tip and ring circuit connections between said transmission line and said station wiring, for interconnecting said transmission line and said telephone equipment, said switching contact means being actuatable to a circuit breaking condition by said line cord plug upon insertion of the line cord plug into said socket to electrically disconnect said line wiring and said telephone equipment from said transmission line upon connecting said telephone set to said transmission line.

6. The station protector and test facility unit defined in claim 5, wherein said structural part comprises a portion of an enclosure for said arrester.

7. In a subscriber telephone system having a telephone transmission line extending from a central office, telephone equipment located at a subscriber's premises and means electrically connecting said telephone equipment to said transmission line, said transmission line having ring and tip conductors, and said means comprising a test jack located on the subscriber's premises, said test jack having a socket sized and configured to slidably receive a line cord plug which is connected at the end of a line cord of a telephone set, ring and tip terminal elements electrically connected to the ring and tip conductors of said transmission line, said ring and tip terminal elements extending into said socket at positions where they are contacted by ring and tip contact elements on said line cord plug upon insertion of said plug into said socket to provide for the connection of said telephone set to said transmission line for receiving a dial tone upon transferring the telephone set its off-hook state in the event that the circuit on the central office side of the test jack is in working order, and normally closed plug-actuatable switching contact means providing normal through tip and ring circuit connections between said transmission line and said telephone equipment, said switching contact means being actuatable to a circuit breaking condition by said line cord plug upon insertion of the line cord plug into said socket to electrically disconnect said telephone equipment from said transmission line upon connecting said telephone set to said transmission line.

8. The subscriber telephone system defined in claim 7 wherein said test jack forms a part of a station protector located at the subscriber's premises and having a lightning arrester connected to said transmission line, and said test jack being connected to said line on the subscriber's side of said arrester.

9. The subscriber telephone system defined in claim 8 wherein said station protector includes an enclosure for said arrester, and wherein said test jack is mounted at an accessible location on a part of said enclosure.

10. The subscriber's telephone system defined in claim 7 wherein test jack is connected at the interface between the portion of the telephone circuit that the subscriber is responsible for servicing and the portion of the telephone circuit that the telephone company is responsible for servicing.

11. The subscriber telephone system defined in claim 7 wherein said telephone equipment comprises at least one subscriber-owned telephone set having a line cord terminating in a line cord plug which is plugged into a telephone jack in the telephone circuit at the subscriber's premises, and wherein the socket of said test jack is sized and configured to slidably receive the line cord plug of said subscriber-owned telephone set for enabling the subscriber-owned telephone set or one identical to it to be plugged into said test jack to establish the connection of the telephone set to said transmission line at said test jack and the actuate said switching contact means for disconnecting the entire circuit on the subscriber's side of said test jack from the transmission line.

12. A telephone circuit test station located at a subscriber's premises intermediate the subscriber's on-premise telephone equipment and a telephone company's transmission line providing service to the subscriber, comprising a test jack having a socket sized and configured to slidably receive a line cord plug which is connected at the end of a line cord of a telephone set, said test jack further having ring and tip terminal elements connected to the ring and tip conductors of said transmission line, said ring and tip terminal elements extending into said socket at positions where they are contacted by ring and tip contact elements on said line cord plug upon insertion of said plug into said socket to provide for the connection of said telephone set to said transmission line for receiving a dial tone upon transferring the telephone set to its off-hook state, and selectively actuatable switch means providing normal through tip and ring circuit connections between said transmission line and said telephone equipment, said switch means being selectively actuatable to a circuit breaking condition to electrically disconnect said telephone equipment from said transmission line.

13. The telephone circuit test station defined in claim 12 wherein said telephone equipment comprises at least one subscriber-owned telephone set having a line cord plug terminating in a line cord plug which is plugged into a telephone jack in the telephone circuit at the subscriber's premises, wherein the socket of said test jack is sized and configured to slidably receive the line cord plug of said subscriber-owned telephone set for enabling the subscriber-owned telephone set or one identical to it to be plugged into said test jack to establish the connection of the telephone set to said transmission line, and wherein said test jack and switching means are located between said telephone jack and the portion of the transmission line which is exterior to the subscriber's premises.

* * * * *